Nov. 11, 1941. L. H. MORIN ET AL 2,262,193
METHOD OF FORMING AND MOUNTING THERMOPLASTIC FASTENERS
Filed July 14, 1938
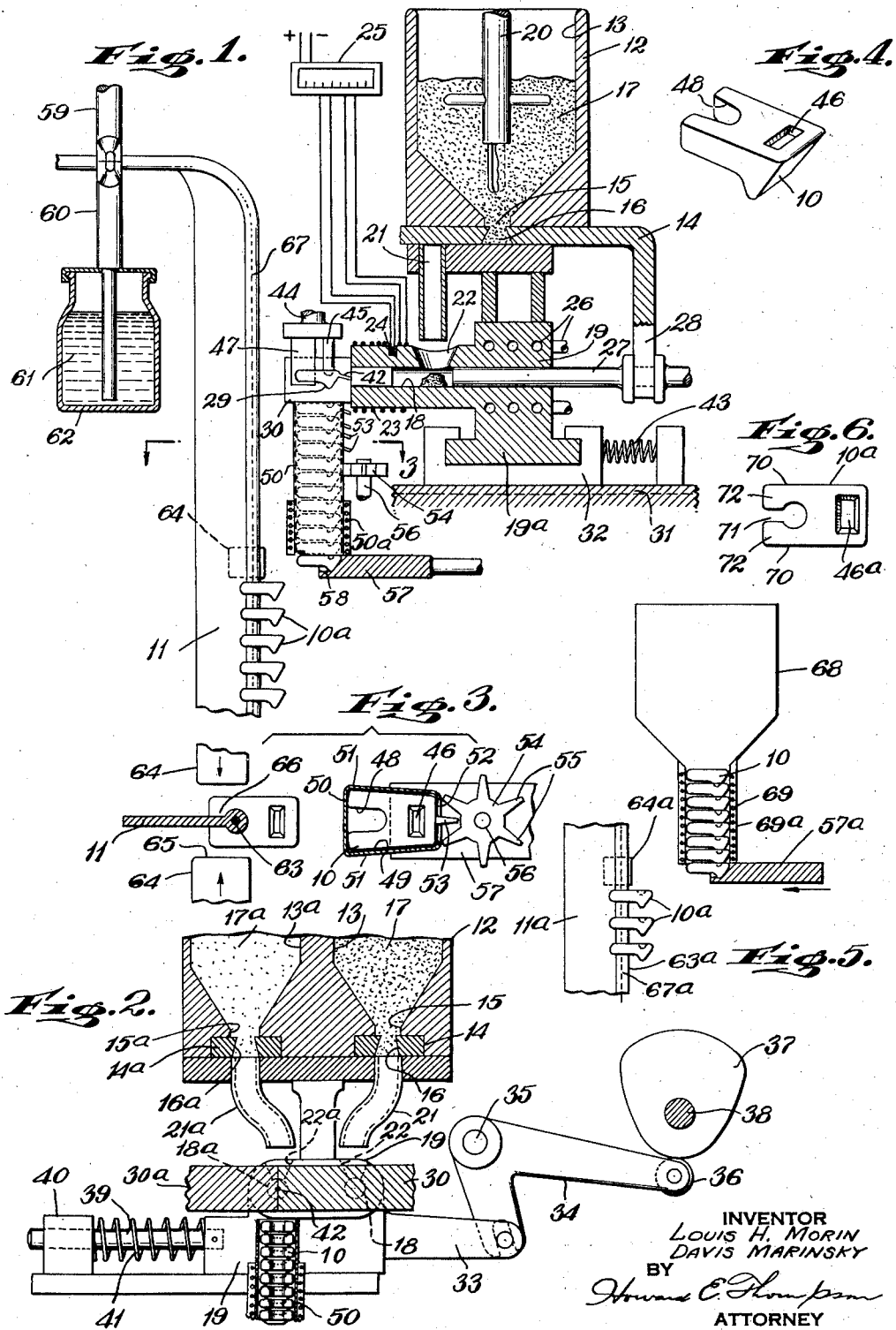
INVENTOR
LOUIS H. MORIN
DAVIS MARINSKY
BY
Howard E. Thompson
ATTORNEY Patented Nov. 11, 1941

2,262,193

UNITED STATES PATENT OFFICE 2,262,193

METHOD OF FORMING AND MOUNTING THERMOPLASTIC FASTENERS

Louis H. Morin and Davis Marinsky, Bronx, N. Y., assignors to Whitehall Patents Corporation, Bronx, N. Y., a corporation of New York Application July 14, 1938, Serial No. 219,143

4 Claims. (Cl. 18—59)

This invention relates to the manufacture of stringers of separable fasteners wherein the coupling links or scoops of the stringers are composed of thermoplastic material, and particularly to a novel method of forming and applying the links or scoops to the stringer tapes in the production of separable fasteners of the character described. More particularly, the invention relates to a method of forming links or scoops and arranging them in a chute or hopper from which the links are fed onto and secured to the tape of the fastener. The novel features of the invention will be best understood from the following description when taken together with the accompanying drawing, in which certain embodiments of the invention are disclosed, and in which the separate parts are designated by suitable reference characters in each of the views, and in which:

Fig. 1 is a diagrammatic sectional view indicating the method of forming and attaching the links in the production of separable fastener stringers.

Fig. 2 is an irregular front sectional view of part of the structure shown in Fig. 1.

Fig. 3 is a partial section on the line 3—3 of Fig. 1.

Fig. 4 is a perspective view of one of the cast links detached.

Fig. 5 shows another method of assembling links prior to attachment to the stringer tape; and, Fig. 6 is a plan view of a modified form of link detached.

To illustrate one method of carrying the invention into effect, the accompanying drawing diagrammatically illustrates a method of die casting links or scoops of separable fasteners and transferring the pre-formed scoops onto the mounting tape and securing the links thereto.

In Fig. 1 of the drawing there is diagrammatically shown part of the mechanism for forming the links 10 and mounting them on the tape 11. In this figure, together with Fig. 2, 12 represents a hopper casing having independent hopper compartments 13, 13a, with slides 14—14a movable across the discharge openings 15—15a of said compartments. The slides have apertures 16—16a for measuring predetermined quantities of a thermoplastic material 17—17a for delivery into independent cylinders 18—18a of a cylinder block 19. The casting or molding material 17—17a may be in the form of particles, granular or powdered, of thermoplastic material, such for example as cellulose acetate. In some instances and as seen in Fig. 1 of the drawing, an agitator 20 may be disposed in each hopper to stir the material 17 to insure a feed thereof through the discharge opening 15. In some instances, a biscuit, capsule or the like, of required volume may be fed into and through the machine either from a hopper or by removal from a rod in the manner taught in prior applications Serial No. 131,606, filed March 18, 1937, and Serial No. 131,608, filed March 18, 1937.

Arranged below the casing 12 and in alinement with the apertures 15—15a and in position to register with the apertures 16—16a of the slides 14—14a are curved discharge or feed tubes 21—21a; the lower ends of which preferably extend toward each other to provide a closer arrangement of the cylinders 18—18a and to dispose the lower ends of the tubes 21—21a above and in registering alinement with apertures 22—22a in the block 18 and registering with the cylinders 18—18a. The forward or discharge end of each cylinder is heated by an electric heating coil 23, only one of which is shown in Fig. 1 of the drawing. This coil is in circuit with a pyrometer composed of a thermocouple, resistance coil or similar temperature sensitive means 24, and a suitably calibrated meter 25 for measuring the temperature at the discharge end of the nozzle to insure the proper heating of the thermoplastic material therein. At the rear portion of the cylindrical block 19 is shown means 26 whereby water or another cooling agent may be passed through the block to cool the rear end of the cylinder 26a.

In each cylinder 18—18a, there is arranged a piston or plunger 27, which is coupled with the forked end 28 of the slides 14—14a. These pistons are operated by suitable means and at the proper time interval in the cycle of operation for discharging or ejecting the material from the cylinders into the impression or mold cavity 29 of the separate die parts 30—30a. These pistons are actuated through resilient means in accordance with the teachings in application Serial No. 131,608, before mentioned.

Arranged on a bed plate or table 31 of the machine is a guide or slideway 32 in which the lower flanged end 192 of the block 19 is slidably movable. The block 19 has an extension 33 at one side connected to a suitable link 34, pivoted as at 35 and having an anti-frictional roller 36 at the end thereof, which operates upon a cam 37 arranged on a shaft 38. Coupled with the other side of the block 19 is a rod 39 which slides through a bearing 40. A spring 41 is arranged on the rod between the bearing 40 and the block 19 and serves to support the roller 36 in constant engagement with the surface of the cam 37.

The cam 37 controls the shifting movement of the block 19 and the hopper casing 12 thereon as well as the other associated parts to bring the respective cylinders 18—18a into registering alinement with the gate or admission opening 42 at the parting line of the die parts 30—30a; or in other words, in position to permit the injection of the casting material into the impression 29 of the dies. It will be apparent that during the intervals between alternate injections from the cylinders 18—18a, the openings at the ends of said cylinders will be sealed by the die parts 30—30a respectively. A spring 43 is employed to support the cylinders in firm engagement with the die parts in the injecting operation, and suitable means will be provided to simply relieve the pressure in the sliding movement of the cylinders with respect to the dies to reduce the frictional engagement but not sufficient to permit the discharge of the heated casting material.

As shown in Fig. 1 of the drawing, a vertically movable member 44 is employed in conjunction with the dies 30. This member has a core pin 45 adapted to form the recess 46 in the upper surface of the link 10 as clearly shown in Fig. 4. The member 44 has another core pin 47 adapted to form a groove 48 in one end of the link to provide a forked end on the link permitting mounting thereof on the tape 11. The side walls 49 of the link 10 as seen in Fig. 3 are tapered outwardly at the forked mounting end thereof.

Below the dies 30 and centered on the parting line thereof is an elongated hopper or chute 50 having side walls 51 tapered to conform to the shape of the castings and having an opening 52 along the narrow side portion to permit passage of the gates 53 on said castings. Intermediate the ends of the hopper 50 and registering with the opening 52 is a suitable cutter wheel 54 having blades 55 rotatable about an axis 56 and adapted to sever the gates 53 on the castings as clearly shown in Figs. 1 and 3 of the drawing. At the lower end of the chute 50 is a feed bar 57 movable transversely of the chute and having means as at 58 for supporting a link at the end thereof.

As shown in Fig. 1 of the drawing, it will appear that the tape 11 may be treated with a suitable cement or solvent prior to the application of the links thereon by passing the tape between a suction pipe or tube 59 and a feed tube 60, both being in registering alinement so that a cement or solvent 61 in a suitable container 62 may be applied to the tape. The tape is then passed by suitable means to a position wherein the mounting edge 63 is adjacent and in alinement with the chute 50 and wherein the said mounting edge passes between pressure tools or jaw members 64 in alinement with the feed bar 57 and movable transversely toward and from the mounting edge 63 of the tape.

The faces 65 of the members 64 are flat or of other predetermined shape and adapted to compress the diverging sides 49 of a link 10 into substantially parallel position as shown at the left of Fig. 3 of the drawing, and at the same time to close the groove 48 about the mounting edge 63 as clearly seen at 66. The cement or solvent previously applied to the tape serves to firmly unite the links to the tape. It will be understood at this time that a rayon thread 67 may be incorporated in the mounting edge 63 of the tape to form a more positive bond between the links and the tape as taught in an earlier application, Ser. No. 129,317, filed March 6, 1937.

In the synchronized operation of the elements employed in this improved method of forming and mounting links, a casting is made between the dies 30—30a and around the core pins 45 and 47, at the same time that a link is being compressed onto the mounting tape 11. As the dies 30—30a open, the feed bar 57 returns to the position shown in Fig. 1. Then the new casting is carried downwardly by the core pins 45, 47 forcing the links downwardly in the chute 50 and disposing the lowermost link in position on the feed bar as clearly seen in Fig. 1. In this downward movement of the links within the chute, the cutter wheel 54 severs the gate from one of the links intermediate the ends of the chute. The dies 30—30a are then partially closed and the core pins 45, 47, stripped from the newly formed link. This is the point of the operation which is indicated by the position of parts in Fig. 1.

During the above operation the tape 11 is moved downwardly by any suitable means to bring a new portion of the mounting edge thereof into position to receive the next successive link. Then as the dies 30—30a are brought together, the feed bar 57 carries the link arranged thereon toward the mounting edge of the tape 11. At this time, it will be understood that the downward movement of the tape 11 between successive casting and mounting operations will control the normal spacing of adjacent links as well as the usual wide spacing between groups of links.

In order to compress the links onto the mounting edge of the tape, the links must be relatively warm and plastic or in what might be termed a re-formable state. Thus the compressed links will assume a new form and will not spring back to the original shape as cast. In the normal synchronized operation as above described, the time interval during which the links remain in the chute 50 may be sufficiently short to retain the links in a relatively plastic condition, or a suitable heating means as indicated at 50a may be employed to re-heat the links before being fed to the mounting member. It will also be understood at this time that the links after being compressed on the tape 11 may be quickly chilled by any suitable means.

In Fig. 5 of the drawing, there is shown an alternate method of mounting the links. In this method, pre-formed links 10 as shown in Fig. 4 are placed in a hopper 68 having at the lower end thereof a feed or chute 69 registering with a feed bar 57a. While the gate portions of the links shown in Fig. 5 have been removed prior to delivery of the links to the hopper 68, it will be understood that the gate portions may be removed at any point in the operation of forming and mounting the links. For example, a cutter wheel, similar to the wheel 54 shown in Fig. 1, might be employed adjacent the chute 69, in which case the chute 69 would have an opening along one side thereof similar to the opening 52 in the chute 50, note Figs. 1 and 2.

The links 10 feed downwardly in the chute by gravity and are carried by the feed bar 57a into position between the members 64a which compress them on the mounting edge 63a of the tape 11a in the manner previously described. It will be apparent in this alternate method that suitable heating means 69a must be employed along the feed or chute 69 to heat the links therein and soften them sufficiently to permit compressing of the forked ends thereof on the mounting edge 63a of the tape. It will be noted that the mounting edge 63a also preferably includes a rayon thread 67a to insure a positive uniting of the links and tape as previously described.

In Fig. 6 there is shown a modified form of link 10a. This link is cast with substantially parallel side walls 70. A recess 46a is formed in the upper surface of the link at one end portion thereof, and an opening 71 to permit mounting of the link on a tape is formed at the other end of the link by movable core pins similar to the pins 45 and 47 above described. In the present modification, however, it will be noted that the opening 71 is bounded by the jaw members 72 and has a contour substantially the same as the cross-section of the mounting edge of the tape.

In mounting this type of link on a tape, the jaws 72 are sprung over the mounting edge thereof; there being sufficient resiliency in the thermoplastic material to permit the springing of the jaw members without permanently distorting the shape of the link. In mounting this type of link, it will be apparent that the heating means above referred to in connection with the guide chutes 50 and 69 would be omitted and cooling means might even be substituted to insure complete setting of the cast link before it is mounted on the tape. It will further be apparent that either form of link may be positively secured to the tape by treating the tape together with the links thereon with a suitable solvent like acetone, as taught in an earlier application, Ser. No. 129,317, filed March 6, 1937.

The use of a plurality of injection cylinders 18—18a serves two important purposes in this improved method of forming and mounting thermoplastic elements. In the first place, it materially increases the speed of casting said elements in that casting material may be heated in one cylinder at the same time that casting material is being injected into the dies from the other cylinder. In this way no time is wasted in bringing the casting material to a plastic state; and since an element is compressed on the mounting member simultaneously with each injection into the dies, the speed of production is doubled by using the two injection cylinders. In the second place, two different colored casting materials may be employed in the separate injection cylinders. When two different colors are employed, in the normal casting operation, the resulting links will be arranged on the mounting member in alternate colors. It will be understood, however, that the cam 37 shown in Fig. 2 may be replaced by other suitable cams as taught in an earlier application Ser. No. 131,608, filed March 18, 1937, for producing series of alternate links or series of links in different colors. In forming groups of links of alternate colors, however, it will be apparent that the speed of production will be reduced in casting successive links of one color since time must be allowed for heating the casting material after each injection.

While the method as above described has been applied primarily to the forming and mounting of thermoplastic elements, it will be understood that the method, and especially the modification shown in Figs. 5 and 6, may be used in the mounting of elements formed of thermo-setting materials such as Bakelite. In this connection, it is of importance that the solidified material be sufficiently resilient to permit the springing of the jaw portions of the links or elements over the mounting edge of the tape as previously described.

While for purposes of illustration the operation of this improved method has been shown as applied to forming separable fastener links and securing them upon a mounting member, the method is likewise applicable to the forming of other elements from plastic material and mounting them in a predetermined manner on a suitable support.

Having fully described our invention, what we claim as new and desire to secure by Letters Patent is:

1. The method of producing an article of manufacture comprising a mounting member having a plurality of die cast plastic elements arranged and spaced longitudinally of said member, which comprises forming die cast elements by pressure injection of heated thermoplastic material into relatively movable dies, removing each casting from the dies and delivering the same to a stack, intermittently feeding a mounting member to bring longitudinally spaced portions thereof into position to receive said elements, heating the elements arranged in the stack adjacent the delivery end of the stack, intermittently feeding the heated elements from the stack onto the spaced portions of said member simultaneously with the formation of other elements in said dies, and applying pressure to said elements while arranged on said portions of the member in securing the same to said member.

2. The method of producing an article of manufacture comprising a mounting member having a plurality of die cast plastic elements arranged and spaced longitudinally of said member, which comprises forming die cast elements by pressure injection of heated thermoplastic material into relatively movable dies, removing each casting from the dies and delivering the same to a stack, intermittently feeding a mounting member to bring longitudinally spaced portions thereof into position to receive said elements, trimming the elements arranged in said stack, heating the elements arranged in the stack adjacent the delivery end of the stack, intermittently feeding the heated elements from the stack onto the spaced portions of said member simultaneously with the formation of other elements in said dies, and applying pressure to said elements while arranged on said portions of the member in securing the same to said member.

3. The method of producing an article of manufacture comprising a mounting member having a plurality of die cast plastic elements arranged and spaced longitudinally of said member, which comprises forming die cast elements by pressure injection of heated thermoplastic material selectively from independent sources of supply into relatively movable dies, removing each casting from the dies and delivering the same to a stack, intermittently feeding a mounting member to bring longitudinally spaced portions thereof into position to receive said elements, heating the elements arranged in the stack adjacent the delivery end of the stack, intermittently feeding the heated elements from the stack onto the spaced portions of said member simultaneously with the formation of other elements in said dies, and applying pressure to said elements while arranged on said portions of the member in securing the same to said member.

4. The method of producing an article of manufacture comprising a mounting member having a plurality of die cast plastic elements arranged and spaced longitudinally of said member, which comprises forming die cast elements by pressure injection of heated thermoplastic material into relatively movable dies, removing each casting from the dies and delivering the same to a stack, intermittently feeding a mounting member to bring longitudinally spaced portions thereof into position to receive said elements, applying a cement compound to at least said spaced portions of said mounting member, heating the elements arranged in the stack adjacent the delivery end of the stack, intermittently feeding the heated elements from the stack onto the spaced portions of said member simultaneously with the formation of other elements in said dies, and applying pressure to said elements while arranged on said portions of the member in securing the same to said member.

LOUIS H. MORIN.
DAVIS MARINSKY.